US009234500B2

(12) United States Patent
Frederiksen

(10) Patent No.: US 9,234,500 B2
(45) Date of Patent: Jan. 12, 2016

(54) METHOD OF PRODUCING A COMPOSITE SHELL STRUCTURE

(75) Inventor: Henrik Frederiksen, Kolding (DK)

(73) Assignee: FM GLASFIBER A/S, Kolding (DK)

( * ) Notice: Subject to any disclaimer, the term of this patent is extended or adjusted under 35 U.S.C. 154(b) by 730 days.

(21) Appl. No.: 13/518,124

(22) PCT Filed: Dec. 22, 2010

(86) PCT No.: PCT/EP2010/070510
§ 371 (c)(1),
(2), (4) Date: Jun. 21, 2012

(87) PCT Pub. No.: WO2011/076857
PCT Pub. Date: Jun. 30, 2011

(65) Prior Publication Data
US 2012/0257984 A1     Oct. 11, 2012

(30) Foreign Application Priority Data
Dec. 22, 2009   (EP) ..................................... 09180341

(51) Int. Cl.
*F03D 1/06* (2006.01)
*B29C 70/48* (2006.01)
*B29C 70/54* (2006.01)
(Continued)

(52) U.S. Cl.
CPC .............. *F03D 1/0675* (2013.01); *B29C 70/48* (2013.01); *B29C 70/541* (2013.01); *B29K 2105/0809* (2013.01); *B29K 2105/246* (2013.01); *B29L 2031/082* (2013.01); *B29L 2031/085* (2013.01); *Y02E 10/721* (2013.01)

(58) Field of Classification Search
CPC ....... F03D 1/065; F03D 1/0675; B29B 11/16; B29C 70/48; B29C 70/541; B29L 2031/082; B29L 2031/085; B29K 2105/0809; B29K 2105/246
See application file for complete search history.

(56) References Cited

U.S. PATENT DOCUMENTS 8,444,792 B2 *  5/2013  Ossanai ........................ 156/93
2003/0218102 A1  11/2003  Van Dam et al.
(Continued)

FOREIGN PATENT DOCUMENTS

DE   10 2006 017 897 A1   10/2007
EP         1 112 928 A2    7/2001
(Continued)

*Primary Examiner* — Edward Look
*Assistant Examiner* — Juan G Flores
(74) *Attorney, Agent, or Firm* — Nath, Goldberg & Meyer; Jerald L. Meyer; Tanya E. Harkins

(57) ABSTRACT

A method of producing a composite shell structure in the form of a wind turbine blade shell part having a reinforced fiber material embedded in a cured resin includes: providing a mold part having a contour defining the outer surface of the composite shell structure; providing a preform forming part shaped complementary to the mold part molding surface; forming a preform of dry fiber material on the surface of the preform forming part; arranging the mold part and the preform forming part in an assembled position with the mold part molding surface facing the preform forming surface; releasing the preform from the preform forming surface so that it is received on the mold part molding surface; removing the preform forming part from the mold part; forming a mold cavity by means of a second mold part arranged on the preform; providing resin in the mold cavity; and curing the resin.

11 Claims, 5 Drawing Sheets

Figure 1:
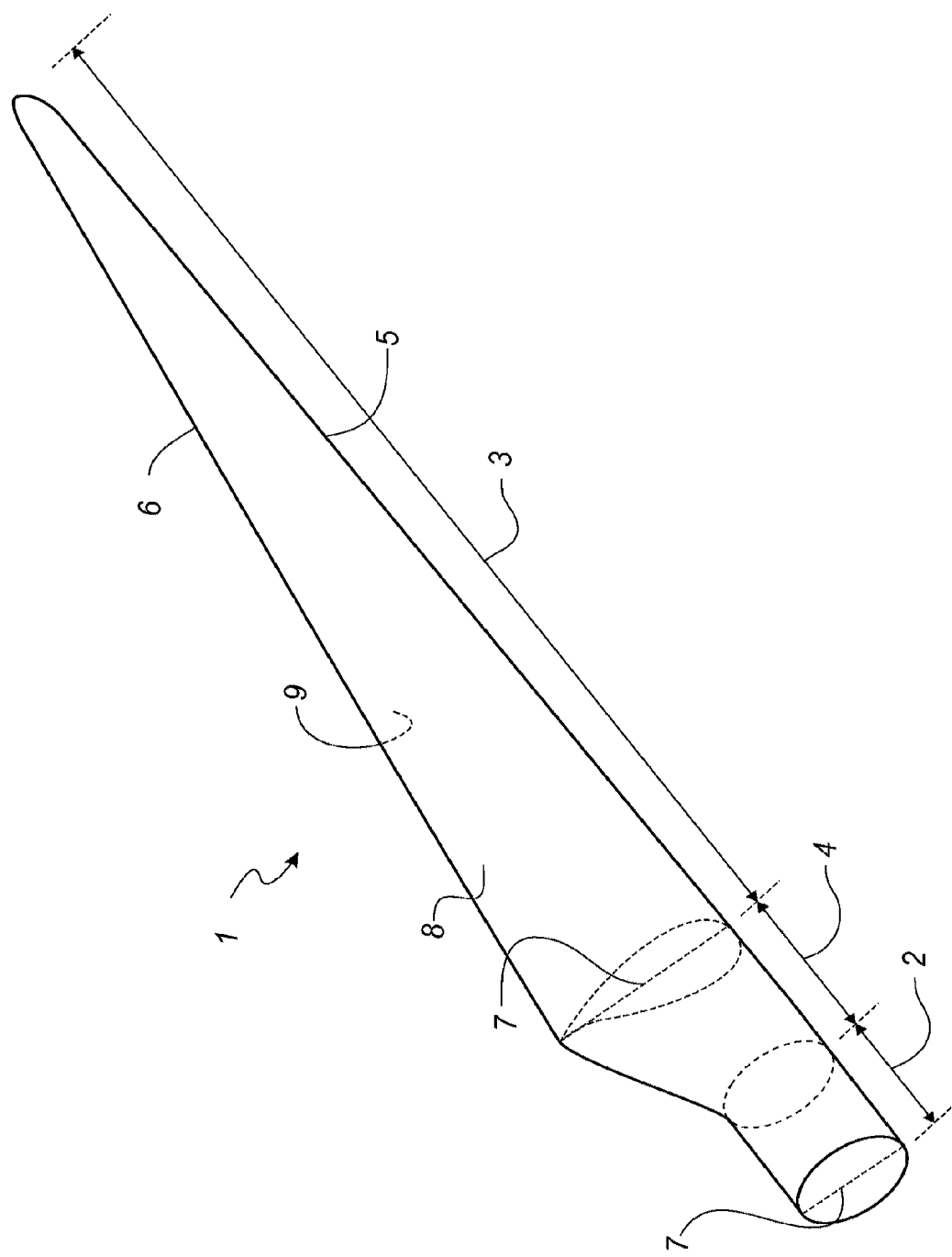

(51) Int. Cl.
  *B29K 105/24* (2006.01)
  *B29L 31/08* (2006.01)
  *B29K 105/08* (2006.01)

(56) References Cited

U.S. PATENT DOCUMENTS

2007/0036659 A1* 2/2007 Hibbard .................. 416/233
2011/0103965 A1* 5/2011 Mathew .................. 416/233

FOREIGN PATENT DOCUMENTS

| | | | |
|---|---|---|---|
| EP | 1 845 258 A1 | 10/2007 | |
| EP | 2 368 034 A1 | 9/2011 | |
| EP | 2 368 035 A1 | 9/2011 | |
| WO | WO 8905717 A1 * | 6/1989 | ............ B29C 43/14 |
| WO | 02/08600 A1 | 1/2002 | |
| WO | 2007/045244 A1 | 4/2007 | |
| WO | 2007/065434 A1 | 6/2007 | |
| WO | 2007/118581 A1 | 10/2007 | |
| WO | 2009/083987 A1 | 7/2009 | |

* cited by examiner

METHOD OF PRODUCING A COMPOSITE SHELL STRUCTURE

This is a National Phase Application filed under 35 U.S.C. §371 as a national stage of International Application No. PCT/EP2010/070510, filed Dec. 22, 2010, claiming the benefit from European Patent Application No. 09180341.1, filed Dec. 22, 2009, the entire content of each of which is hereby incorporated by reference in its entirety.

The present invention relates to a method of producing a composite shell structure comprising a reinforced fibre material embedded in a cured resin, i.e. a cured polymer material.

TECHNICAL FIELD

Methods for producing composite shell structures involve arranging fibre material comprising a number of fibre layers in a mould, closing the mould to form a mould cavity, and curing resin provided in the mould cavity. The resin can be supplied to the mould cavity after closing of the mould by injecting the resin into the cavity for instance by resin transfer moulding (RTM) or by vacuum-assisted resin transfer moulding (VARTM) or by providing the fibre material with resin when being arranged in the mould, i.e. by using a pre-impregnated fibre material, a so-called prepreg.

Especially for large shell structures, such as shells for boats hulls and for wind turbine blades, the time for arranging for the fibre material in the mould is considerable compared to the time for injecting/infusing and curing the resin when using RTM/VARTM and heating and curing the resin when using prepregs.

BACKGROUND

From U.S. Pat. No. 4,992,228 and U.S. Pat. No. 5,080,851 it is known to form a preform of fibre material and to transfer this preform to the mould in which the composite structure is formed.

WO 89/05717 discloses a method of applying a mixture of plastics material and reinforcing fibres to a mould surface of a mould half, said method comprising the steps of placing, e.g. by spraying, a liquid plastics mixture incorporating fibres on a preform forming part whose shape is complementary to the mould surface of the mould half, placing the mould half over the preform forming part with the mould surface upside down, jointly turning the preform forming part and the mould half so that the mould half is located beneath the preform forming part and then removing the preform forming part.

EP 0 271 263 discloses a method of transferring a sheet of pre-impregnated fibre-reinforced material to a mould tool by means of a transfer tool provided with a flexible inflatable diaphragm and having a surface shaped to conform the shape of the surface of the mould tool.

WO 2007/039085 discloses a method of placing a material layer, such as a layer of prepreg., in a mould and comprising the steps of pressing a surface of a elastically-reversibly deformable body against the material layer, generating a holding force, which temporarily fixes the material layer to the surface, and arranging the material layer in the mould by means of the body.

EP 0 577 505 A1 discloses an installation for picking up a pre-cut fibre layer, such as a prepreg., shaping the fibre layer into a preform and transferring the preform to a moulding tool.

DISCLOSURE OF THE INVENTION

It is an object of the invention to obtain a new method of producing a composite shell structure and which is especially adapted for producing large composite shell structures such as boat hull and shell parts for wind turbine blades.

According to the invention this is obtained by a method including the following steps:

A providing a first mould part having a preferably substantially concave mould part moulding surface with a contour defining an outer surface of the composite shell structure;

B providing a preform forming part having a preferably substantially convex and substantially upwardly facing surface being shaped essentially complementary to at least a part of the mould part moulding surface;

C forming a preform by arranging a fibre material comprising a number of fibre layers on the preform forming surface;

D bringing the first mould part and the preform forming part together to an assembled position so that the mould part moulding surface faces the preform forming surface and a cavity is defined between said surfaces and substantially accommodates the fibre material arranged on the preform forming surface;

E transferring the preform to the first mould part by releasing the fibre material from the preform forming surface so that it is received on the moulding surface of the first mould part;

F removing the preform forming part from the first mould part;

G forming a mould cavity by means of a second mould part arranged on top of the fibre material, H curing and/or allowing the resin to cure, and wherein resin is either pre-supplied to or supplied to the fibre material when the latter is arranged on the preform forming surface in step C or supplied to the mould cavity following step G.

By forming a preform of the fibre material in a separate preform forming part and then transferring the preform to the first mould part, the so-called form time, i.e. the time during which the mould is occupied for producing a single composite shell structure, can be reduced considerably compared to known methods, where the laying-up of the fibre material also takes place in the mould. In other words the production time can be reduced as moulding can take place in the mould and a new preform can be prepared in a preform forming part at the same time. This is especially an advantage when producing large shell structures, as the time for arranging the fibre material is longer than moulding time, i.e. the time for injecting/infusing the resin and curing the resin when using the RTM/VARTM and the time for heating and thereby liquefying the resin and curing the resin when using prepreg.

The method is particularly suited for forming shell structures having a convex outer surface such as shells for boat hulls and shells for wind turbine blades. In known methods the fibre material in form of fibre mats is laid up on the concave surface of the first mould part. However, during the laying-up the fibre mats tend to slide on the mould surface in steeply sloping areas thereof, whereby buckles are formed in some portions and the fibre material is missing in other portions of the laid-up fibre material. In order to obviate this problem measures have be to taken to retain the fibre material in the intended position. Such measures are time-consuming and increase the production time. By laying-up the fibre material on a preform forming part having a convex preform forming surface, the problem of sliding and buckling fibre mats are reduced or eliminated.

The fibre material may comprise glass fibres, carbon fibres, polymer fibres, plant fibres, metal fibres, such as steel fibres, and a combination of said fibres.

The fibre material may comprise dry fibre material only.

According to an embodiment of the method the fibre material comprises resin-impregnated material, i.e. a so-called prepreg material.

The fibre material may comprise prepreg material only. However, it is also possible to use dry fibre material and prepreg fibre material in the preform and inject or infuse additional resin into the mould cavity.

In prepreg moulding the reinforcement fibres are pre-impregnated with a pre-catalyzed resin. The resin is typically solid or near solid at room temperature. The prepreg materials provided in the mould cavity is heated to a temperature, where the resin is allowed to flow and the resin is cured after the fibre material has been impregnated. In a modified version of the prepreg method the fibre material is provided with an uncatalyzed resin and a resin containing a catalyst is supplied to the mould cavity.

In a further embodiment of the method resin is supplied to the mould cavity.

When using prepreg. and/or supplying resin to the preform forming surface, it may be necessary to clean said surface between forming of the subsequent preforms in order to prevent the resin from curing on the preform forming surface. By using dry fibre material only and only supplying resin to the mould cavity, i.e. not supplying resin to the preform forming part, the need for cleaning the preform forming surface is eliminated.

As previously mentioned, resin can be supplied by VARTM, whereby liquid resin is supplied to the mould cavity provided with the preform, and where a vacuum is generated in the mould cavity, thereby drawing in the polymer. By the generated vacuum, typically 80-95% of the total vacuum in the mould cavity, the liquid polymer is drawn into and fills the mould cavity with the fibre material.

RTM is similar to VARTM. However, the liquid resin is not drawn into the mould cavity due to a vacuum generated in the mould cavity. Instead the liquid resin is forced into the mould cavity by means of an overpressure.

Regardless of the moulding method used the resin may be thermosetting resin, such as epoxy, vinyl ester and polyester. The resin may also be a thermoplastic, such as PA, PVC, ABS, PP or PE. Additionally, the resin may be an in-situ polymerisable thermoplastic material.

The in-situ polymerisable thermoplastic material may advantageously be selected from the group consisting of prepolymers of: polybutylene terephthalate (PBT), polyamide-6 (pre-polymer is caprolactam), polyamide-12 (pre-polymer is laurolactam) alloys of polyamide-6 and polyamide-12; polyurethanes (TPU), polymethylmethacrylate (PMMA), polyethylene terephthalate (PET), polycarbonate (PC), polyetheretherketone (PEEK), polyetherketone (PEK), polyethersulfone (PES), polyphenylenesulphide (PPS), polyethylenenaphthalate (PEN) and polybutylenenaphthalate (PBN), cyclic poly(1,4-butylene terephthalate) (CBT) and/or combinations thereof.

The in-situ polymerisable thermoplastic material has the advantage that it may be handled in its pre-polymer state as a liquid, a powder or pellets. Accordingly, the material may be used for pre-impregnating the fibre material, i.e. in a pre-preg. Alternatively, it may be sprayed on in powder form on the fibre material or be arranged in the mould parts as separate layers.

In-situ polymerisable thermoplastic materials, such as CBT, have the advantage that they obtain a water-like viscosity when heated to a temperature of approximately 150 degrees Celsius. Thereby, it is possible to quickly impregnate the fibre material of very large composite structures to be moulded and subsequently curing the resin in very short cycle times.

CTB is available as one-part systems, where a catalyst is premixed into the resin, and where the catalyst is activated for instance by heating, and as two-part systems, where the catalyst and resin are kept separately until immediately before use, where they are mixed and supplied to the mould cavity.

In some situations it may be advantageous to supply additional in-situ polymerisable thermoplastic material to the mould cavity in order to impregnate the entire fibre material. In such a situation it may be advantageous to use one-part systems for the pre-supplied resin and two-part systems for the additional resin.

The term polymerisable thermoplastic material means that the material may be polymerised once at the manufacturing site.

According to an advantageous embodiment the mould cavity is evacuated. Also when using other moulding methods than VARTM, it is advantageous to evacuate the mould cavity, as the risk of air or gas enclosures in the finished composite structure is thereby eliminated or reduced.

According to a further embodiment, the second mould part is a flexible mould part formed of a flexible material, preferably a polymer film. By using a flexible polymer film, also called a vacuum bag, as the second mould part and evacuating the mould cavity, it is possible to obtain a desired high fibre-to-resin ratio, as the polymer film is pressed against the fibre material due to the applied vacuum.

According to an embodiment of the invention, prior to step C the flexible mould part is arranged on the preform forming surface. In other words, the flexible mould part is arranged on the preform forming surface of the preform forming part prior to the fibre material being laid up and is subsequently transferred to the first mould part jointly with the formed preform.

The preform forming surface of the preform forming part can be shaped essentially complementary to the entire moulding surface of the first mould part. It is, however, also possible to arrange additional fibre material in the first mould part prior to and/or subsequent to transfer of the preform thereto.

Additionally, two or more separate sub preforms may be formed on separate sub preform forming parts having a preform forming surface shaped substantially complementary to a part or section of the mould part moulding surface, whereafter the separately formed sub preform is transferred to the respective part or section of the first mould part moulding surface.

According to a further embodiment, in step C a core, such as a balsa wood or foam core, is added to the fibre material and thereby to the preform. The cores are advantageously arranged between fibre layers. The cores may be attached to the fibre layers for instance by sewing, stitching or adhesion so as to retain the cores in the desired position.

In an embodiment subsequent to step C, one or more polymer foils are arranged on top of the preform so as to form a cavity between the at least one polymer foil and the preform forming surface. The cavity between the at least one polymer foil and the preform forming surface may be evacuated so as to retain the preform on the preform forming surface during step D.

The preform forming part may be provided with suction means for providing the above evacuation.

The polymer foil is preferably a flexible foil and made of a material compatible with the resin and melts or is dissolved during curing of the resin.

The polymer foil may also form the outer surface of the finished composite shell structure.

According to a further embodiment, the fibre layers in step C are attached to each other for instance by sewing, stitching or adhesion, eg. by using a tacky composition, in order to thereby retain the fibre layers in the desired positions.

Additionally, a binding material such as a liquid tacky binding agent or a powder binding agent may be applied to the fibre material in step C to stiffen the preform.

According to a further embodiment, step D is carried out by moving the first mould part to the assembled position with the preform forming part and then turning the first mould part and the preform forming part upside down.

According to another embodiment, step D is performed by turning the preform forming part and moving it to the assembled position with the first mould part while retaining the preform in the preform forming part.

The preform may be retained in the preform forming part by arranging a polymer foil on top of the preform so as to form a cavity between the polymer foil and the preform forming surface, and evacuating said cavity. Step E may then be performed by releasing the vacuum.

If a polymer film, i.e. a vacuum bag, is provided on the preform forming surface prior to arranging the fibre material thereon, step D, E or F may be performed as follows:

Step D: moving the first mould part to the assembled position with the preform forming part, Step E: evacuating a cavity formed between the polymer film and the first mould part so as to transfer the preform and the polymer film to the first mould part, and Step F: Lifting off the first mould part from the preform forming surface of the preform part.

Supply and curing of the resin may take place with the first mould part in a position, in which the preform faces downwardly and a position, in which the first mould part is turned 180° and the preform faces upwardly, or in any other position of the first mould part.

Wind turbine blades may be manufactured by use of two separately manufactured shell parts forming the pressure side and the suction side of blade, respectively, said shell parts subsequently being glued together.

The present invention may be used for forming each of said shell parts. Thus, a shell part of a wind turbine blade produced by the method according to the invention is within the scope of protection. The shell parts may have a length of at least 30 m, alternatively at least 40 m, alternatively at least 50 m.

However, the present invention may also be used to manufacture a wind turbine blade in one piece by means of a so-called closed hollow moulding as follows:

providing a first preform for forming the pressure side of the blade by performing step A-F;

providing an additional preform for forming the suction side of the blade by performing step A-F by using an additional mould part having a mould part moulding surface with a contour defining an outer surface of the suction side of the blade and an additional preform forming part having a preform forming surface being shaped substantially complementary to the additional mould part moulding surface;

bringing together and assembling the two formed preforms while retained in their respective mould parts in order to thereby form a hollow preform having an inner surface defining a hollow interior and being surrounded by an outer closed mould formed by the first and additional mould parts and wherein a mould cavity is formed by arranging at least one polymer film, i.e. a vacuum bag, on the inner surface of the hollow preform;

evacuating the mould cavity;

curing of the resin and/or allowing the resin to cure, and wherein resin is either pre-supplied to or supplied to the fibre material when the latter is arranged on the preform forming surface in step C or supplied to the mould cavity following step G.

Thus, the scope of the present invention also covers a wind turbine blade produced by a method according to the invention by means of a closed hollow moulding.

BRIEF DESCRIPTION OF THE DRAWING(S)

Figure 2:
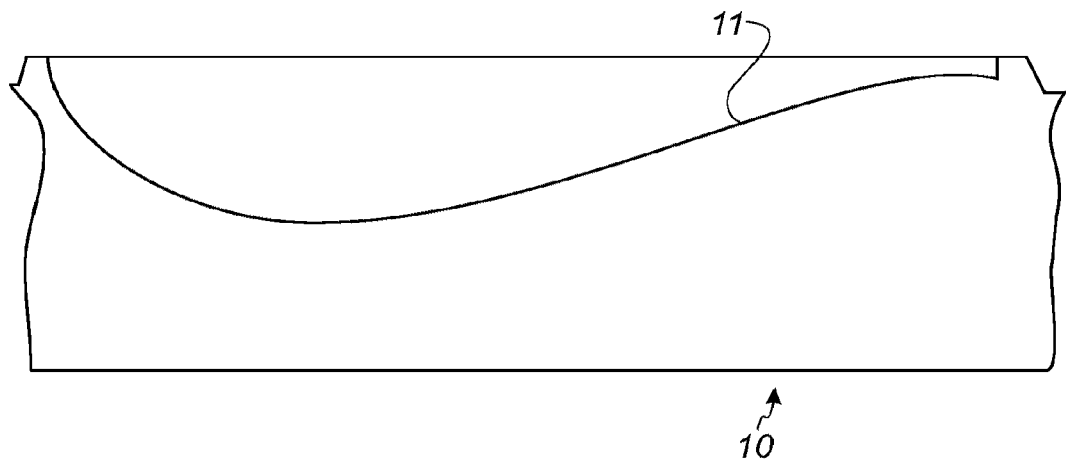
Figure 3:
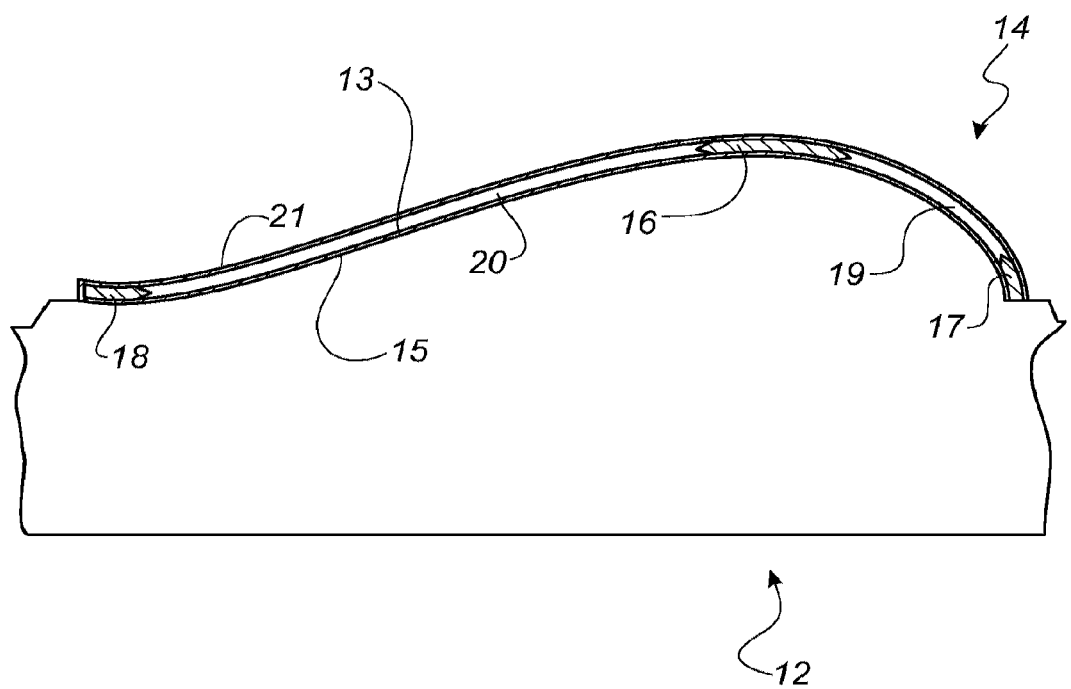
Figure 4:
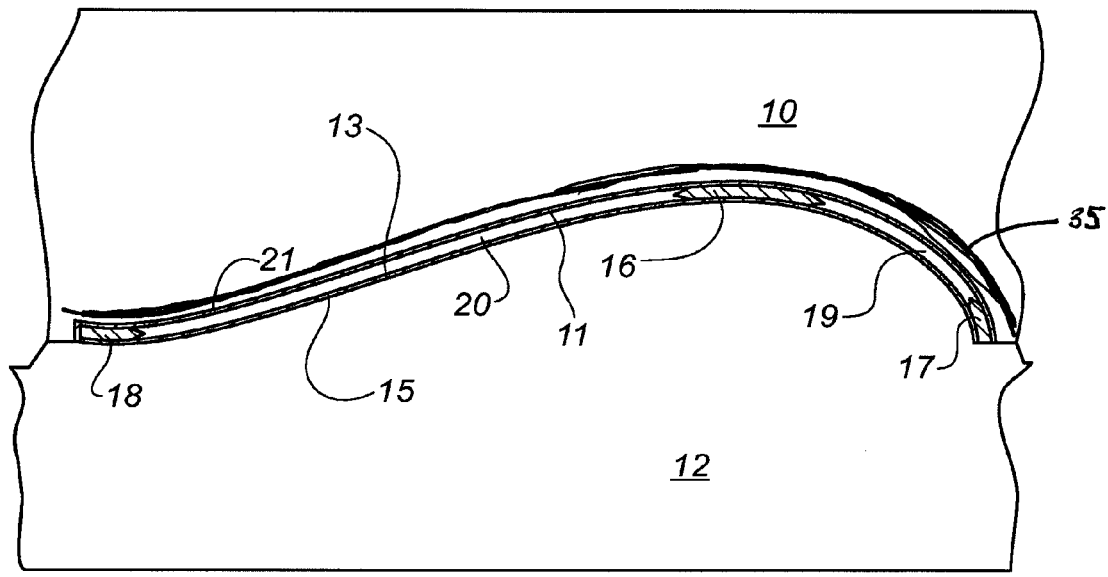
Figure 5:
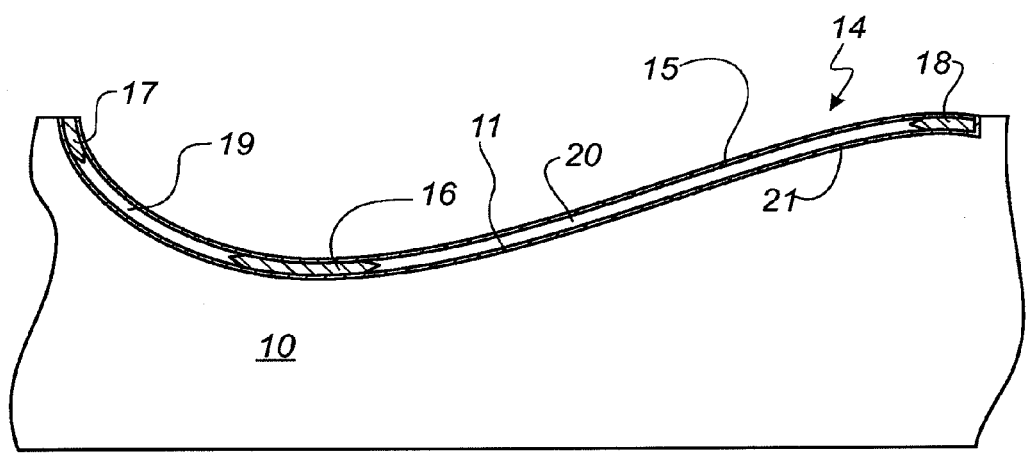
Figure 6:
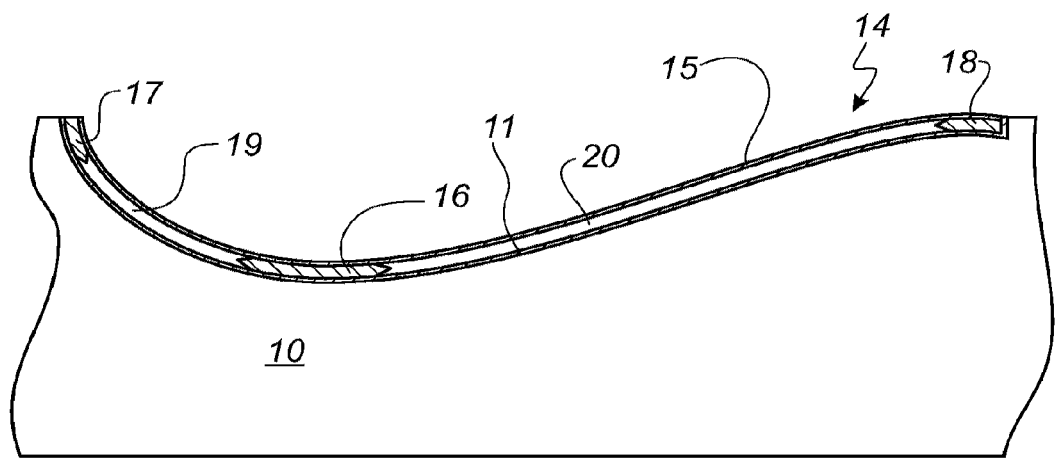
Figure 7:
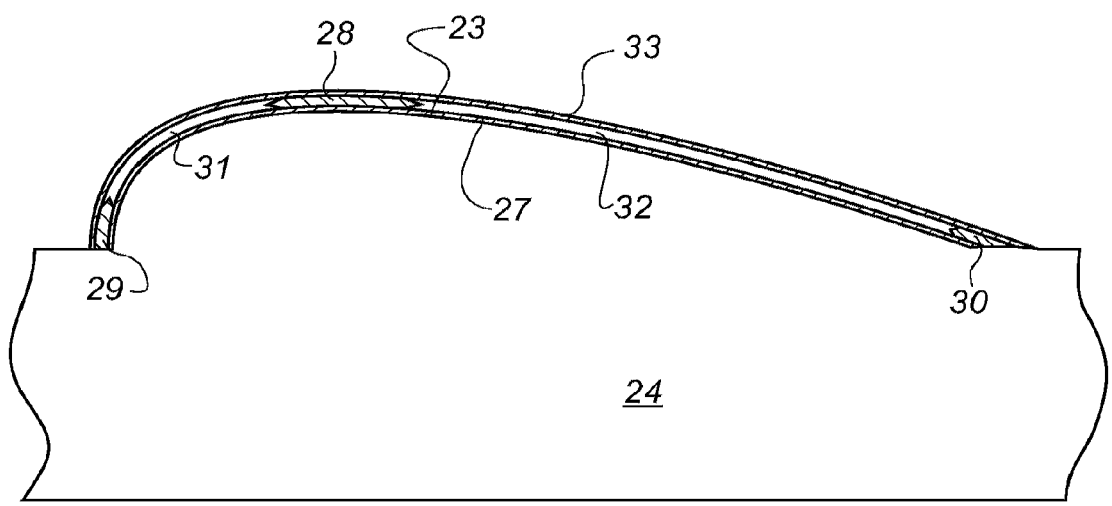
Figure 8:
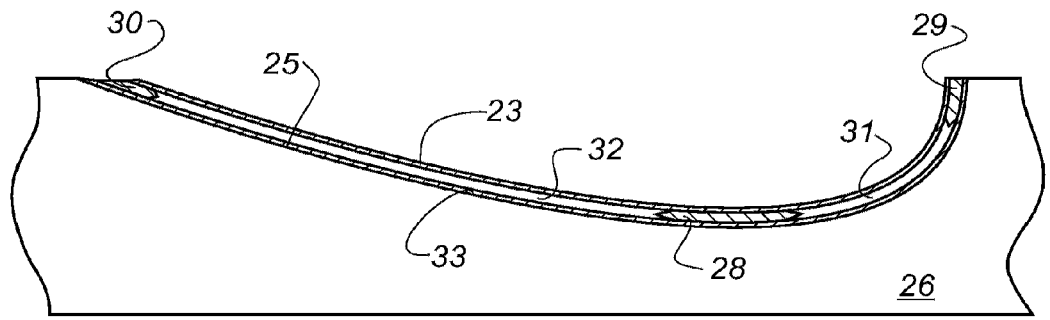
Figure 9:
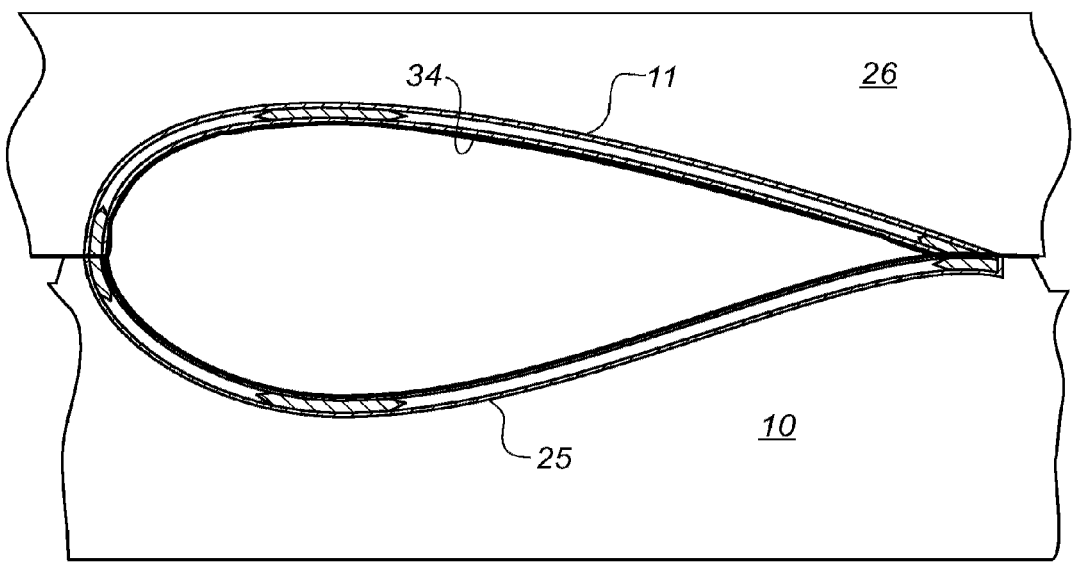

The invention is explained in detail below with reference to the embodiments shown in the drawings, in which FIG. 1 is a schematic view of a wind turbine blade comprising two shell parts forming the pressure side and the suction side of the blade, respectively, and being glued together along the chordal plane of the blade, FIG. 2 is a schematic cross-sectional view of a first mould part for forming the pressure side shell part of the blade, FIG. 3 is a schematic cross-sectional view of a preform forming part for forming a preform of a fibre material, the formed preform also being shown in FIG. 3, FIG. 4 is a schematic cross-sectional view of a step, in which the first part mould has been turned upside down and brought together with the preform forming part into an assembled position, FIG. 5 is a schematic cross-sectional view of a step, in which the preform has been transferred to the first mould part and the preform forming part has been removed from the first mould part, FIG. 6 is a schematic cross-sectional view corresponding to that shown in FIG. 5, the first mould part and the preform transferred thereto, however, being used in a so-called closed hollow moulding, where the wind turbine blade is manufactured in one piece, FIG. 7 is a schematic cross-sectional view of an additional preform forming part, an additional preform being formed on the preform forming surface thereof, said preform forming surface being shaped substantially complementary to an additional mould part moulding surface with a contour defining the suction side of the blade, FIG. 8 is a schematic cross-sectional view of the additional mould part, the additional preform being transferred to the moulding surface thereof, and FIG. 9 is a schematic cross-sectional view of a step, in which the additional mould part shown in FIG. 8 has been turned upside down, while retaining the additional preform therein, and brought together with the first mould part and the preform shown in FIG. 6 to form a hollow preform surrounded by an outer closed mould formed by the first and the additional mould parts.

DETAILED DESCRIPTION OF THE INVENTION

FIG. 1 is a schematic view of a wind turbine blade 1 having the shape of a conventional turbine blade and comprising a root region 2, a profile or an airfoil region 3, and a transition region 4 between the root region 2 and the airfoil region 3. The blade 1 comprises a leading edge 5 and a trailing edge 6. A chordal plane 7 extends between the leading edge 5 and the trailing edge 6 defines the transition between a suction side 8 and a pressure side 9 of the blade. The chordal plane is illustrated by means of a dot-and-dash line. As previously mentioned, the blade 1 may be manufactured by using two separately manufactured shell parts, i.e. a pressure side shell part and a suction side shell part of the blade and subsequently gluing the two shell parts together. Alternatively, the blade may be manufactured as single piece.

As will be explained below, the method according to the invention may be used for producing the separate shell parts of the blade or for producing the blade as a single piece.

The method according to the invention is now explained by means of an embodiment for producing the pressure side shell part of a blade made from two separately produced shell parts which are glued together.

FIG. 2 discloses a first mould part 10 for producing the pressure side shell part of the blade. The first mould part 10 comprises a mould part moulding surface 11 with a contour substantially defining the outer surface of the pressure side 9 of the blade 1.

FIG. 3 is a cross-sectional view through a preform forming part 12 having a substantially convex and substantially upwardly facing preform forming surface 13. The preform forming surface 13 is shaped substantially complementary to the first mould part moulding surface 11 of the first mould part 10. A preform 14 is formed by arranging fibre layers and core parts on the preform forming part 12, the fibre layers and core parts being included in the finished shell part of the wind turbine blade. Lower fibre layers 15 are arranged on the preform forming surface 13. In order to provide a so-called main laminate 16, a plurality of fibre layers is arranged on the lower fibre layers 15 at an upper region of the preform forming part 12. Additionally, a plurality of fibre layers is arranged on the lower fibre layers 15 at the region corresponding to the region of leading edge and the trailing edge, respectively, of the blade shell part to be formed so as to provide a leading edge fibre reinforcement 17 and a trailing edge fibre reinforcement 18, respectively. A first core material 19 is arranged between the main laminate 16 and the leading edge fibre reinforcement 17 and a second core material 20 is arranged between the main laminate 16 and the trailing edge fibre reinforcement 18. One or more upper fibre layers are arranged on top of the main laminate 16, the leading edge fibre reinforcement 17, the trailing edge fibre reinforcement 18, the first core material 19 and the second core material 20.

As shown in FIG. 3, the preform 14 has now been formed. It should be noted that in some embodiments the plurality of fibre layers forming the main laminate 16 and/or the fibre layers forming the leading edge fibre reinforcement 17 and/or the trailing edge fibre reinforcement 18 may be omitted and that the first core material 19 and the second core material 20 may also be omitted.

As shown in FIG. 4, the first mould part 10 and the preform forming part 12 are then brought together to an assembled position by turning the first mould part 10 upside down so that the first mould part moulding surface 11 faces the preform forming surface 13 and a cavity is defined between said surfaces. The shape and the dimensions of the cavity substantially correspond to those of the fibre material arranged on the preform forming surface 13 of the preform forming part 12 so as to substantially accommodate the preform 14. At least one polymer foil 35 is arranged on top of the preform forming surface 13.

The preform 14 is then transferred to the first mould part 10 by releasing the preform 14 comprising fibre material from the preform forming surface 13 such that it is received on the moulding surface 11 of the mould part. In the present embodiment this is performed by turning the first mould part 10 and the preform forming part 12 upside down and subsequently removing the preform forming part 12 from the first mould part 10. The preform 14 is thereby transferred to the first mould part moulding surface 11, as shown in FIG. 5.

If the fibre materials arranged on the preform forming surface 13 of the preform forming part 12 are pre-impregnated materials impregnated with a resin, impregnation of the fibre materials may be performed by arranging a vacuum bag on top of the lower fibre layer 15, which is now is the upper fibre layer of the preform 14, sealing the vacuum bag to the first mould part 10, providing vacuum in a cavity formed between the vacuum bag and the first mould part moulding surface 11, heating the pre-impregnated resin so that it is liquefied and impregnates the fibre materials and subsequently cured to form the shell part, in the present embodiment the pressure side shell part of the wind turbine blade.

Alternatively, when using VARTM to form the shell part, a vacuum bag is arranged on top of the preform 14 and sealed to the first mould part 10 so as to form a mould cavity. The mould cavity is then evacuated and resin supplied to the mould cavity by means of the provided vacuum to impregnate the fibre materials of the preform 14. The fibre material of the preform 14 may be a dry fibre material or a combination of a dry fibre material and a pre-impregnated fibre material impregnated with a resin compatible with the infused resin during the VARTM.

A method for producing a wind turbine blade in one piece by means of a so-called closed hollow moulding using an embodiment of the method according to the invention is explained in the following.

As explained above with reference to FIGS. 2-5, a preform 14 is formed on the preform forming surface 13 of the preform forming part 12 and transferred to the moulding surface 11 of the first mould part 10. The preform 14 is adapted to be incorporated in a shell part of the wind turbine blade formed in one piece, said shell part forming the pressure side of the blade. FIG. 6 shows the preform 14 transferred to the moulding surface 11 of the first mould part 10.

An additional preform 22 adapted to be incorporated in the suction side shell part of the blade is formed on a preform forming surface 23 of an additional preform forming part 24, as shown in FIG. 7. The preform forming surface 23 of the additional preform forming part 24 is shaped essentially complementary to a mould part moulding surface 25 of an additional mould part 26 shown in FIG. 8. Like the preform 14 the additional preform 22 comprises a lower fibre layer 27, a plurality of fibre layers forming a main laminate 28, a plurality of fibre layers forming a leading edge fibre reinforcement 29, a plurality of fibre layers forming a trailing edge fibre reinforcement 30, a first core material 31 arranged between the leading edge fibre reinforcement 29 and the main laminate 28, a second core material arranged between the trailing edge fibre reinforcement 30 and the main laminate 28, and one or more other fibre layers 33 arranged on top of the main laminate 28, the leading edge fibre reinforcement 29, the trailing edge fibre reinforcement 30, the first core material 31 and the second core material 32, as shown in FIG. 7.

Subsequent to being formed on the preform forming surface 23 of the additional preform forming part 24, the additional preform 22 is transferred to the mould part moulding surface 25 of the additional mould part 26, as shown in FIG. 8. In the present embodiment, the additional preform 22 is transferred to the additional mould part 26 by turning the additional preform forming part 24 upside down from the position shown in FIG. 7, while the additional preform 22 is retained in the additional preform forming part 24, and then releasing the preform 22 from the additional preform forming part 24 such that the preform is received on the moulding surface 25 of the additional mould part 26. The additional preform forming part 24 is then removed from the additional mould part 26.

In the present embodiment, the additional preform 22 is retained in the additional preform forming part 24 by arranging a polymer foil on top of the additional preform 22 to form a cavity between the polymer foil and the preform forming surface 23 and evacuating said cavity.

After the two preforms 14, 22 have been formed and transferred to their respective mould parts 10, 26, the preforms are brought together and assembled while being retained in their respective mould parts so as to form a hollow preform having an inner surface defining a hollow interior and being surrounded by an outer closed mould formed by the first and the additional mould parts 10; 26, as shown in FIG. 9.

A mould cavity is formed by arranging at least one polymer film 34, i.e. a vacuum bag, on the inner surface of the hollow preform and subsequently evacuating the mould cavity.

When the fibre material used for forming the preforms 14, 22 is pre-impregnated with a resin, the mould parts 10, 26 are heated to liquefy the resin, which is subsequently cured to provide the blade formed as a single piece.

If the fibre material used for forming the preforms is a dry fibre material, the blade is formed as a single piece by infusing a liquid resin into the cavity by means of the provided vacuum and allowing the resin to cure.

The invention has been described with reference to advantageous embodiments. However, the scope of the invention is not limited to the described embodiments, and alterations and modifications may be carried out without deviating from the scope of the invention.

LIST OF REFERENCE NUMERALS

1 Wind turbine blade
2 Root region
3 Airfoil region
4 Transition region
5 Leading edge
6 Trailing edge
7 Chordal plane
8 Suction side
9 Pressure side
10 First mould part
11 First mould part moulding surface
12 Preform forming part
13 Preform forming surface
14 Preform
15 Lower fibre layer
16 Main laminate
17 Leading edge fibre reinforcement
18 Trailing edge fibre reinforcement
19 First core material
20 Second core material
21 Upper fibre layer
22 Additional preform
23 Preform forming surface
24 Additional preform forming part
25 Mould part moulding surface
26 Additional mould part
27 Lower fibre layer
28 Main laminate
29 Leading edge fibre reinforcement
30 Trailing edge fibre reinforcement
31 First core material
32 Second core material
33 Upper fibre layer
34 Polymer film

The invention claimed is:

1. Method of producing a composite shell structure in form of a wind turbine blade shell part comprising a reinforced fibre material embedded in a cured resin and comprising the following steps:

A providing a first mould part having a preferably substantially concave mould part moulding surface with a contour defining an outer surface of the composite shell structure;

B providing a preform forming part having a preferably substantially convex and substantially upwardly facing preform forming surface being shaped essentially complementary to at least a part of the first mould part moulding surface and arranging a flexible mould part on the preform forming surface;

C forming a preform by arranging a dry fibre material comprising a number of dry fibre layers on the preform forming surface and arranging at least one polymer foil on top of the preform;

D bringing the first mould part and the preform forming part together to an assembled position so that the first mould part moulding surface faces the preform forming surface and a cavity is defined between said surfaces and substantially accommodates the fibre material arranged on the preform forming surface of the preform forming part;

E transferring the preform to the first mould part by releasing the fibre material from the preform forming surface so that it is received on the moulding surface of the first mould part;

F removing the preform forming part from the first mould part;

G forming a mould cavity by means of a second mould part arranged on top of the fibre material, and supplying resin to the mould cavity;

H curing and/or allowing the resin to cure;

wherein the second mould part is the flexible mould part formed of a flexible polymer film and wherein the at least one polymer foil is made of a material which is compatible with the resin and melts or is dissolved during curing of the resin.

2. Method according to claim 1, wherein the fibre material only comprises a dry fibre material.

3. Method according to claim 1, wherein resin is supplied only to the mould cavity.

4. Method according to claim 1, wherein the mould cavity is evacuated.

5. Method according to claim 1, wherein the preform forming surface is shaped substantially complementary to the entire first mould part moulding surface.

6. Method according to claim 1, wherein in step C cores made of balsa wood or foam, are added to the fibre material and thereby to the preform.

7. Method according to claim 1, wherein the preform forming part is provided with suction means.

8. Method according to claim 1, wherein at least some of the fibre layers in step C are attached to each other.

9. Method according to claim 1, wherein step D is performed by moving the first mould part to the assembled position with the preform forming part and then turning the first mould part and the preform forming part upside down.

10. Method according to claim 1, wherein step D is performed by turning the preform forming part upside down and moving it into the assembled position with the first mould part, while the preform is retained in the preform forming part.

11. A shell part of a wind turbine blade or a wind turbine blade produced by a method according to claim 1.

* * * * *